(12) United States Patent
Trobrillant

(10) Patent No.: US 9,292,098 B2
(45) Date of Patent: Mar. 22, 2016

(54) INPUT APPARATUS

(76) Inventor: Jean Marc Trobrillant, Karlsruhe (DE)

(*) Notice: Subject to any disclaimer, the term of this patent is extended or adjusted under 35 U.S.C. 154(b) by 124 days.

(21) Appl. No.: 14/000,820

(22) PCT Filed: Apr. 13, 2011

(86) PCT No.: PCT/DE2011/075073
§ 371 (c)(1),
(2), (4) Date: Oct. 21, 2013

(87) PCT Pub. No.: WO2012/113363
PCT Pub. Date: Aug. 30, 2012

(65) Prior Publication Data
US 2014/0043237 A1    Feb. 13, 2014

(30) Foreign Application Priority Data
Feb. 23, 2011    (DE) .................. 10 2011 000 899

(51) Int. Cl.
G09G 5/00    (2006.01)
G06F 3/02    (2006.01)
G06F 3/023    (2006.01)

(52) U.S. Cl.
CPC ............ *G06F 3/0202* (2013.01); *G06F 3/0238* (2013.01)

(58) Field of Classification Search
CPC . G06F 3/04886; G06F 3/0238; G06F 3/0412; H01H 13/83; H01H 3/125
USPC ................................. 345/156–184
See application file for complete search history.

(56) References Cited

U.S. PATENT DOCUMENTS

| 4,633,227 | A | 12/1986 | Menn |
| 2003/0128191 | A1 | 7/2003 | Strasser et al. |
| 2006/0084482 | A1 | 4/2006 | Saila |
| 2006/0132449 | A1 | 6/2006 | Pironio |
| 2008/0131184 | A1* | 6/2008 | Brown et al. ............... 400/490 |
| 2009/0153491 | A1* | 6/2009 | Moosavi ..................... 345/172 |
| 2012/0084966 | A1* | 4/2012 | Larsen et al. ............... 29/527.1 |
| 2014/0097857 | A1* | 4/2014 | Hu .............................. 324/661 |
| 2014/0247219 | A1* | 9/2014 | Pedersen et al. ............. 345/168 |

FOREIGN PATENT DOCUMENTS

| DE | 83 03 605 | 6/1983 |
| DE | 35 32 327 A1 | 3/1987 |
| DE | 40 17 897 C1 | 11/1991 |
| DE | 690 26 770 T2 | 7/1996 |
| DE | 197 58 403 A1 | 7/1999 |
| DE | 10 2005 025 301 B4 | 12/2006 |
| DE | 10 2007 016 703 A1 | 10/2007 |

(Continued)

OTHER PUBLICATIONS

Japanese Office Action and Translation, received in Japanese Patent Application No. 2013-554790, dated Feb. 17, 2015, 8 pages.

*Primary Examiner* — Kent Chang
*Assistant Examiner* — Nelson Rosario
(74) *Attorney, Agent, or Firm* — Hubbard Law, PLLC

(57) ABSTRACT

An input device featuring a representation means with a transparent keypad situated above a representation means, wherein the keypad consists of a multitude of transparent keys and functions are mapped to the keys of the keypad, the functions being represented by means of symbols which are displayed within an area on the representation means assigned to the respective keys.

23 Claims, 2 Drawing Sheets

(56) References Cited

FOREIGN PATENT DOCUMENTS

| EP | 0 196 929 A1 | 10/1986 |
| FR | 2 907 927 A1 | 5/2008 |
| JP | 61-168427 A | 7/1986 |
| JP | H9-505172 A | 5/1997 |
| JP | 2000-339429 A | 12/2000 |
| JP | 2008-517363 A | 5/2008 |
| WO | WO 92/22864 A1 | 12/1992 |
| WO | 95/35534 A1 | 12/1995 |
| WO | WO 2008/065195 A1 | 6/2008 |
| WO | WO 2010/030279 A1 | 3/2010 |

\* cited by examiner

INPUT APPARATUS

RELATED APPLICATION

The present application is a National Phase entry of PCT Application No. PCT/DE2011/075073, filed Apr. 13, 2011, which claims priority from DE Application No. 10 2011 000 899.3 filed Feb. 23, 2011, said applications being hereby incorporated by reference herein in their entirety.

FIELD OF THE INVENTION

The presented invention concerns an input device featuring a representation means with a transparent keypad situated above a representation means, wherein the keypad consists of a multitude of transparent keys and functions are mapped to the keys of the keypad, the functions being represented by means of symbols which are displayed within an area on the representation means assigned to the respective keys.

BACKGROUND OF THE INVENTION

Such an input device is already known from U.S. Pat. No. 4,633,227. This type of input device, having the shape of a computer keyboard, has keys which which allow to see a display means made of plastic and which is situated below them. Using a handwheel, the display means can be placed into different positions. According to the position, different areas of the display means become visible, so that different keyboard layouts can be achieved. It is also possible to take out and turn around the display means in order to add further layouts. The position of the hand wheel indicates which layout has been chosen, so that the corresponding key signals can be transmitted to a connected computer.

A further, similar input device is already known from US patent application US 2003/0128191 A1. This document describes an input device with a regular computer screen that a transparent keyboard is assigned to. One portion of the computer screen is reserved for the transparent keyboard. This portion has touch-screen functionality and features raised, springy keys. When pressing keys, the user receives a feedback. Besides optical and possibly acoustic notifications, there is also an additional haptic or tactile feedback. Because the transparent keys are partially located above the screen, symbols can be displayed underneath the keys. These symbols can be perceived by the user through the surface of the keys. The symbol identifies the function of the key located directly above itself. Therefore, updated functionality of the keys can be accompanied by a change of display, effectively adapting the key labels.

Another related device is shown in German patent publication DE 40 17 897 C1. It discloses a control device for a vehicle. Here, single keys and/or a slide control are located above a display on which the possible functions of the switching means above are displayed.

The fundamental problem is therefore that multiple functions may be assigned to one key, partially also dependent on the software in use, and that said functions are not necessarily discernable by the user. Hence, when using common keyboards or switching elements, the user has to know in advance the different key combinations and underlying functions, or otherwise he may need to look them up or learn them by trial and error.

In this light one has to consider German patent application DE 83 03 605 from 1983. It proposes the use of an adjustable barrel by the aid of which different functions can be assigned to special function keys provided for this purpose. According to the position of the barrel, each key is assigned a different function which is displayed on the barrel, visible behind a viewing panel. Besides changing the functionality of the keys, by turning the adjustable barrel, it is also possible to effect a change of the display above said keys.

Another advancement can be seen in German patent application DE 35 32 327 A1, wherein a writing automaton with alterable keys is presented. The keys exhibit segment displays which are supposed to represent values assigned to the respective keys. However, by employing segment displays, the range of symbols which can be represented is considerably restricted.

German patent DE 10 2005 025 301 B4 allows for a much higher degree of freedom. It describes an input device which can, in one possible variant, consist of a common keyboard and a touchscreen area, one half each. Accordingly, the touchscreen area can be used as an extension of the common keyboard and thus provides an area for adjustable allocation and usage.

Finally, German patent application DE 10 2007 016 703 A1 from the same field presents a medical appliance with an input device. Here, the keys and the area located around them, respectively, are equipped with a display. This display is to be realized by use of either electronic ink or by means of an LC display.

SUMMARY OF THE INVENTION

There is a fundamental need for adaptability, and therefore the object of the present invention is to provide an input device which can be adapted to the needs of the user by a very high degree.

The task is solved by an input device according to independent claim 1. Further reasonable embodiments of such an input device are described in the dependent claims.

For instance, such an input device can be a computer keyboard or an integrated keypad within a remote control, an electronic game or another technical device which is to be controlled. Such a keyboard consists of a keypad which can comprise any number of keys and sub-keypads in any desired combination. The keys of the keypad are transparent so that the surface of the keys allows the user to view a representation means located beneath said keypad. The representation means serves the purpose of representing a character or symbol beneath the transparent keys. The user relates this character or symbol to the function of the key above. For example, in this way, if a key is supposed to be assigned the character "A", then underneath it on the representation means, the character "A" is shown.

However, it is known that different regions employ different layouts for keyboards and keypads. For instance, while on a common keyboard with 105 keys a number of keys can be present which always have the same function, some keys may change their functionality depending on the language type. In order to obtain the greatest freedom possible, according to this invention, the representation means below the transparent keypad is preferably detachable.

There are two fundamental alternatives of the invention, namely on the one hand an analogue variant, which has a display means implemented by a board, for instance a board which is imprinted, and which is in any shape and holds the keyboard layout. On the other hand, there is a digital variant consisting of a changeable display means. The digital variant includes a display means which can be attached either separably or inseparably to its casing.

The possibility of taking out the display means and the modularity of the invention which follows from this allows for a number of enormous advantages which cannot be obtained by the devices disclosed by documents from the state of the art. By exchanging the display means, the complete keyboard layout can be changed for the onlooker at once, so that when the keyboard in question is used in a device of another language, a modification can take place without any problem. It is also intended that the scope of activities is changed by exchanging one or multiple blocks of keys by another block of keys with a different number of keys, without having to buy a new device. In the same manner, single keys may be exchanged.

The fact that analogue display means can be removed makes it possible that either, other display means can be placed into the input device as replacements, or that, for example, by turning the display means around, an alternative embodiment can be accessed, which can also be digital, for instance. It is further possible to prefabricate the greatest part of the input device, including the complete set of keys. Merely an element which is detachable in the final state of the input device, namely the display means, has to be added in this final state in order to bring about an individualization of the device.

This is enormously advantageous. Due to this feature, the language setting of input devices can be determined at the last possible point in time. This can be illustrated by the example of a producer of such input devices: In order to supply all of Europe with all of its languages, the producer only has to keep one type of keyboard in storage in an assembled state. Upon request, it is only necessary to add the respective display means in the desired language in order to complete the delivery. It is not required to keep in stock devices in different language versions, only the the display means need to be available in the desired language versions.

Additionally, if the display means possesses a recognition means which characterizes the keyboard layout on the respective active side of the board, it is possible to form a contact with a readout unit or a connection module. For instance, a display means designed in this manner can communicate to the readout or the connection module, respectively, that a German keyboard layout is present, facilitating the communication between the input device and the system which is connected to it. For this reason, it is not required provide a separate setting for the desired keyboard layout. Rather, this choice is made autonomously via systems standing in relation with the input device, e.g., in the case of a computer keyboard by means of a driver running on the system which is connected to the input device.

The recognition means can be a memory, for instance, holding a code that characterizes the keyboard layout and which can be read out. However, as a recognition means a pin is also sufficient which closes a certain circuit due to its position and which is positioned in the input device by entering the display means.

In order to be able to completely dispense with preparation of the keyboard, it is also possible to employ clear display means which can be signed by hand. For instance, an embodiment is intended for use which employs an erasable (e.g., washable) board, suitable for adding the corresponding designations by use of a water-soluble pen, chalk, or other soluble writing means. The keys can then be freely configured with regard to their functions by means of a software.

According to another embodiment, there is a plate which can be designed in the manner of a drawer, so that it provides a slot for entering an assignment sheet with a keyboard assignment printed onto it. Therefore, it is possible to merely exchange the assignment sheet, replacing it by either a customly printed or a pre-printed assignment sheet. In the latter case, the pre-printed assignment sheet can feature a recognition means, for instance in the form of a chip which allows to identify the imprinted keyboard layout.

The digital alternative goes one step further, implementing the display means by a digital display module, for example as a LED, OLED, or LCD device, or any other display means in any desired shape.

In response to a keystroke and corresponding requests from the system attached to the input device, in an especially preferred embodiment the readoutunit evaluates whether one or more keys need to change due to the information received. For instance, upon usage of the shift key, all symbols previously displayed in lower case may now be displayed in upper case. It may be a requirement of a system that a software within a computer system offers different functions when a key is pressed. It is also possible to display functions such as the save function, symbolized by a floppy disc icon, or the open function, symbolized by an arrow or a similar icon. This can occur during data entry so that, for instance, the key display only remains changed as long as the shift key is held down. As soon as the shift key is released, the previous display is restored.

By means of a connector which interconnects display module and connection module, a readout unit which is connected to the display module via the connection module forwards instructions to the display module. These specify how the keyboard layout shall be represented on the display module. A direct connection between readout unit and display module is also possible here. For this purpose, the control unit employs information from a classification module which belongs to the keyboard casing and/or the contact module. This classification module is a memory unit which contains information regarding the distribution of the keys or a code from which the driver may derive the properties of the keyboard. This aids in deriving the properties regarding the locations of the keys on the display as well as their inscriptions as realized by the display module.

Both embodiments of the display means further have the special advantage that one and the same display means can be entered into different types of keyboards. Thus, the same display module may, by exchange of the casing, either implement a computer keyboard, a piano keyboard or a specialized keyboard, for example for gaming consoles, control devices, medical devices, etc. Especially in the case of an analogue display means it is possible to enter it only partially into respective casing, for instance in order to only use the required parts of the display means.

Such a removable display means also has advantages in regard to disposal because parts of the casing can be easily separated from the electronics belonging to the display means by taking out the display means. Advantageously, it is possible to separate also the other electronic components such as for example the readout unit and the connection module from the casing of the input device. This design also allows a relatively liberal choice of components to be employed, especially the modular structure of the input device according to the wishes of the user.

Besides usage of the invention in regular computer keyboards, as demonstrated above, this type of input device can also be employed in other devices which allow for control, for instance mobile phones, gaming controllers or laptop PCs.

In order to obtain a good viewability of the areas of the display means situated underneath the key block, and to provide for optimal stability, it is an option that the key block is placed upon a contact module, on which the single keys can be attached. They are attached with interposing contact switches which are activated when the respective key is pressed. The contact switches can be positioned just beneath the key edges or in the region of their edges so that the contact switches do not obstruct the view of the representation means located below. Furthermore, the contact switches may also be embedded into an encapsulation underneath the keys, preferably consisting of silicone, so that the complete contact module and they key block, respectively, can be washed by the user if need be. Contact of washing water or other fluids with the electronics is prevented in this manner.

As far as switches are used which are transparent or almost optically imperceptible, the keys can also be attached onto the contact module using their complete area.

On the one hand, the contact module itself provides a support for the keypad for implementing the springiness of the keys. On the other hand, the contact module spans above the representation means. For this reason, it makes sense to provide a contact module which is a board which is transparent at least beneath the keys. Through such a transparent board, the representation means can always be observed. Within the areas in which no keys are provided by the contact module, there can be a decoration that the user may choose, implemented by means of a decoration layer. This decoration can be superimposed by gluing, printing on or superimposed in another manner. However, it is also possible to keep further areas besides the keys unoccupied so that the representation means can be viewed through them.

Within the input device, a central connection module may be included. When a key is pressed, this is registered and the information is forwarded via a readout unit to a connection module. It can evaluate and/or process the data if required and forward them to a system attached to the input device.

It is part of the invention that either the contact module itself is used as the lid of the input device casing, or that alternatively a fitting frame or a casing lid, respectively, is put on which spans over the contact module, providing spaces for the keys sitting on the contact module.

In place of the contact module or besides it, other control techniques may be used, based for example on touchscreen layers or nep layers, which can be activated by keys that are pressed down, or which can be activated manually or by gestures in the case of areas on the input device spared providing spaces for the keys. This is possible in the case of the analogue as well as the digital display means.

It is explicitly part of the scope of the invention that single keys may be non-transparent and imprinted, and that some sections of the display module may be used as an imprinted plate by imprinting particular sections of the display module.

There is further modularity because multiple display means can be combined in one input device. They have a data connection to a common readout unit, and can also be received by different casing modules and possibly be connected to different connection modules.

A special embodiment of the invention is its implementation as a computer keyboard where a display area is reserved within the area of the contact module such that the display module depicts a calculator display. In this case, either the whole keyboard or only a part of it, for example its number pad, can be employed as a calculator. The operations and results of the calculator can be shown on its display. The keys located outside the number pad can be freely programmed or reserved for mathematical operations.

The power supply of such a calculator can be implemented in the following ways: There may be a USB connector constantly providing the required voltage or a unit providing solar power or a battery as power supply.

In another preferable embodiment of the invention, connection means can be added to the connection module that belongs to the modules discussed above. For instance, USB connection means may be added to the connection module so that further peripheral devices may be attached to the keyboard. It is also possible to add a connector for a further number pad to the keyboard. Additional keys or key blocks of different sizes or other third-party devices can also be connected, for instance in order to extend or turn the input device into a telephone system, a gaming console or a similar device. Furthermore, it is sensible to add an optical effect to the transparent keys within the area of their surface. For example, the display means below may be shown enlarged by means of a magnification effect, enhancing the visibility as perceived by the user.

In addition to the input devices used above, it should be mentioned especially that the display means, be it analogue or digital, can be used in a device with pressure sensors, for instance for usage as a musical instrument. For musical instruments, not only the pressure exerted upon a key is of interest, but the force as well which is applied by the keystroke. According to the strengths of the pressure the volume and/or the dynamics of the musical instruments can be influenced in the same manner as with an analogue instrument.

To simulate this effect, it is advantageous to provide input elements with pressure sensors by means of a pressure sensing module, receiving the key press force of single keys and forwarding them to the readout unit.

Finally, it is a tremendous advantage of the novel input device that the display means is removable. With regular use of a keyboard, it is inevitable that at least dirt or dust enters keyboard and settles on the keys, with a displeasing visual outcome. Cleaning conventional keyboards is very laborious because of the required separation of keys, which have been exposed to dirt, from the electronic components of the keyboard because the keys must first be removed individually, and finally need to be reassembled in the correct layout. In addition, the labeling of the individual keys washes away with time.

This is not necessary in the case of the input device according to this invention in the case that the display means is removed. In this condition, the input device can be placed into for instance a cleaning automaton as a whole, without any danger of damaging labeling or any functional components of the keys. With regard to the electronics which are present besides display means, these can either be encapsulated in a water-proof manner, so that they can remain in the input device, or they can also be placed into the casing of the input device in a detachable manner.

The invention as described above is now explained by means of an application example.

BRIEF DESCRIPTION OF THE FIGURES

The following figures are included within this application.

DETAILED DESCRIPTION OF THE FIGURES

Figure 1:
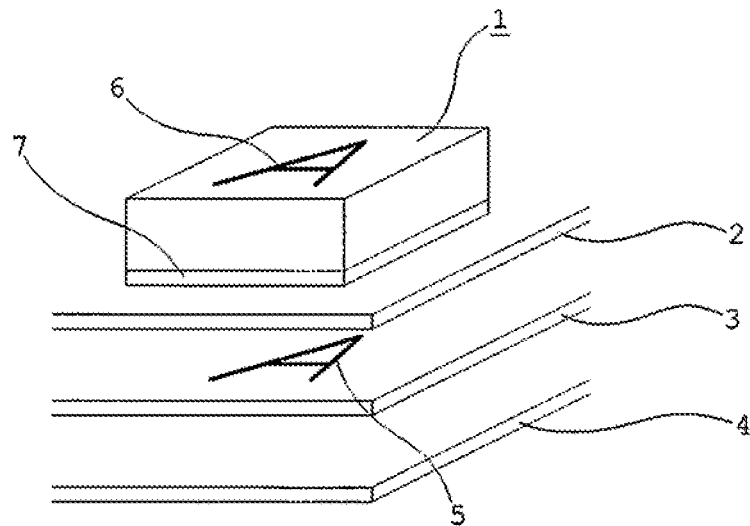
FIG. 1 shows the schematic design of an input device according to the invention in a perspective view on its cross-section.

FIG. 1 shows the design of the input device, substantially consisting of a contact module 2 that serves as the basis for a row of keys 1, with a display module 3 beneath it. Contact module 2 forms the basis of the block of keys as part of the construction of the input device. On top of it, there are the keys 1 with contact switches 7 between them, said contact switches 7 being encapsulated in silicone. When a key 1 is pressed, the contact switch 7 is pressed together and causes an electrical impulse which is conducted by suitable leads belonging to contact module 2 to the external connection module 10. The contact switches 7 are encapsulated in silicone in order to improve the springiness of key 1 and to provide a device which can be brought into contact with water. Key 1 is transparent, just like the corresponding area of contact module 2 below, so that a symbol 5 represented by display module 3 is visible on the surface of key 1. The pictogram 6 visible on the surface of key 1 can be magnified by means of the lens effect in order to enhance the visibility for the user. This effect may be obtained by including a lens feature either within the surface of key 1 or the area of contact module 2 below.

This design has the advantage that with a removable display module 3, suitable to be entered into other keyboards or input devices, the keyboard layouts of these other keyboards can also be controlled. Therefore, the user only needs a display module in order to use a multitude of different keyboards. Additionally, display module 3 allows for the possibility that the pictogram 6 shown on key 1 is adjusted as needed, in the case that this is required by the software accessed via the input device. As soon as a function different from entry of the character "A" is assigned to the key in question, a symbol for this new function is shown on display module 3 below the corresponding key 1. Consequently, the user can perceive the corresponding pictogram 6 on the key and notice instantly which function is now assigned to the respective key.

In this embodiment of the invention, contact module 2 also serves as the lid of the casing so that the area around keys 1 can be imprinted with a pleasant decoration. At locations where parts of display module 3 are supposed to serve as an additional display means, contact module 2 has to be transparent so that the area below display module 3 remains visible for the onlooker. Opposite contact module 2, which acts a lid for the casing, there is a casing bottom 4, arranged in such a way that between contact module 2 and casing bottom 4, sliding in or entering the display module 3 is possible. Hence, display module 3 can easily be taken out and placed into another keyboard. Conversely, it is possible to enter a representation means such as a simple imprinted board in place of the display module, imposing a static keyboard layout.

Figure 2:
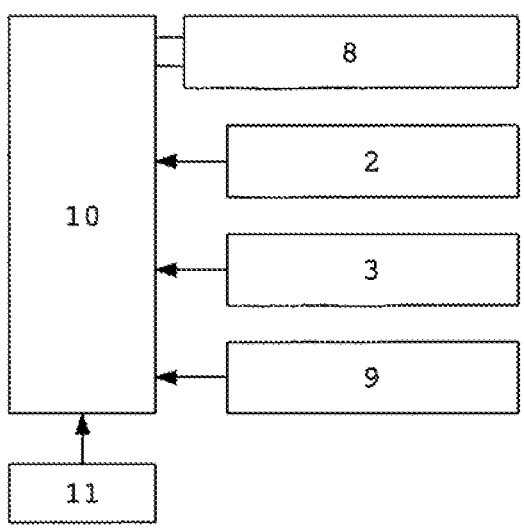
FIG. 2 shows an overview of the functionality of the input device according to the invention.

FIG. 2 shows a connection scheme with readout unit 8 at its center. On the one hand, the readout unit 8 receives input from the user via contact module 2 and forwards it to the system which is connected to the input apparatus. On the other hand, upon actions of the system and in reaction to key presses from contact module 2, respectively, it forwards commands for displaying the keyboard layout on display module 3. The casing of the keyboard or the contact module 2 with keys 1, respectively, features a classification module 9 which is also connected to readout unit 8. In this classification module 9, basic information about the key arrangement on the keyboard is stored, for instance that the used keyboard is a keyboard with 105 keys. This information is taken into account by readout unit 8 for both interpretation of the keystrokes and for the purpose of displaying the keyboard layout. By means of connection module 10, it becomes possible to add further connection means to the keyboard in order to change it into a universal device. Here, a USB connection means 11 should be integrated, extending the input device with the capabilities of a USB hub. In this respect, a connection module 10 and a USB connection means are provided, extending the input device so that it becomes a USB hub. It should be pointed out that in addition to or in place of central readout unit 8, it is also possible that any other of the connected modules features a readout unit of its own.

Figure 3:
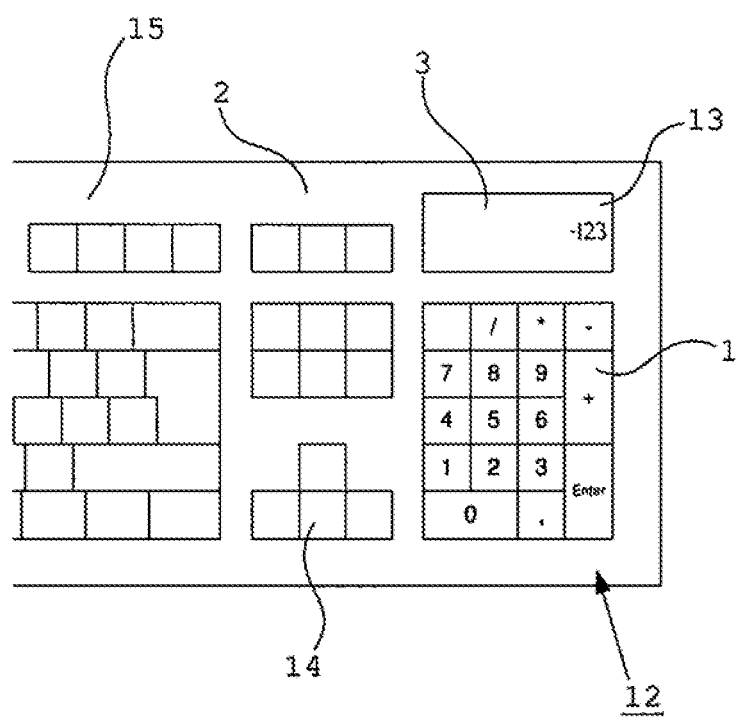
FIG. 3 shows the input device according to the invention in a top view.

FIG. 3 shows a section of a contact module 2 with a keypad wherein the keypad fulfills a special purpose. Because there is an energy source independent from the system, the number pad of the keyboard in question is employed as a calculator. For this reason, the common mathematical operators as well as digits are displayed on display module 3, which is situated beneath contact module 2. The remaining unused keys 14 are not shown here so that they remain empty for the user. In this embodiment, display module 3 has a display area 13 on which the operations of the calculator are shown. The operations are executed by control unit 8, which belongs to the input device. In order to allow for a visible display, contact module 2, situated above display area 13, maintains a free space above display area 13 of the display module and the area beneath keys 1. The remaining area of contact module 2 is available as a decoration area 15 for custom use. A decoration desired by the user can be imprinted, glued or coated on it in another manner.

An input device has been described which, due to its design, is highly adaptable and therefore also especially inexpensive to manufacture. This is achieved by making the keyboard layouts dependent on the representation means which can be inserted underneath the transparent keypad and which can be exchanged for an alternative display means if required. Conversely, in the case of a representation means implemented as a display module, the casing can be exchanged and completely different cases and a different scope of functionality can be applied in combination with the display module.

REFERENCE LIST

1. Key
2. Contact module
3. Display module
4. Case bottom
5. Symbol
6. Pictogram
7. Contact switch
8. Readout unit
9. Classification module
10. Connection module
11. USB connection means
12. Number pad
13. Display area
14. Unused keys
15. Decoration area

The invention claimed is:

1. Input device with a transparent keypad situated above a representation means, wherein the keypad consists of a multitude of transparent keys and functions are mapped to the keys of the keypad, the functions being represented by means of symbols which are displayed within an area on the representation means assigned to the respective symbols and situated beneath single keys, and wherein the keypad and the representation means are integrated in a common casing, wherein the representation means arranged below the keypad is exchangeable as it is detachable from their common casing, and wherein the representation means communicates with the input device in order to determine the functions mapped to the keys.

2. Input device according to claim 1, wherein the representation means is a board preferably in the shape of a drawer with a receptacle for inserting a graphical representation of the key assignments held by an assignment sheet, wherein the assignment sheet entered into the receptacle features a means for recognition implemented as a memory device, and the means for recognition is readable by means of a readout device of the input device when the display means is assigned to the input device according to its intended use.

3. Input device according to claim 2, wherein the keypad is positioned upon a contact module, wherein the respective keys are attached to the contact module in a detachable or non-detachable manner by means of contact switches realizing a springiness of the keys, said contact switches preferably being encapsulated within an elastic material such as silicone, and the contact module has a data link to a readout unit, the readout unit being capable of receiving information regarding the activation of keys of the keypad from the contact module and forwarding said information to a system associated with the input device, and wherein the contact module is preferably implemented as a board revealing the representation means situated underneath by means of predefined areas which are partially transparent.

4. Input device according to claim 1, wherein the representation means is implemented by a display module which displays symbols underneath the keys representing the functions of the respective keys, at least some parts of said display module being a digital display module.

5. Input device according to claim 4, wherein the keypad is placed upon a contact module, wherein the respective keys are attached to the contact module in a detachable or non-detachable manner by means of contact switches realizing a springiness of the keys, said contact switches preferably being encapsulated within an elastic material such as silicone, and the contact module having a data link to a readout unit, the readout unit being capable of receiving information regarding the activation of keys of the keypad from the contact module and forwarding said information to a system associated with the input device, and wherein the contact module is preferably implemented as a board revealing the representation means situated underneath by means of predefined areas which are partially transparent, wherein preferably the casing or the contact module feature a classification module capable of providing information regarding the key assignments to the input device and which can be connected to the readout device.

6. Input device according to claim 5, wherein the display module is connected via a connection module to the readout device, and control of the display module is performed using, the information available from the readout device regarding the present keyboard type, wherein preferably the readout device listens for a keystroke and/or a request by a system connected to the input device and evaluates whether the function of the respective key needs to be changed accordingly, and in this case the representation means shall be accessed for the purpose of displaying a symbol that represents the changed function in the area of the representation module assigned to the respective key.

7. Input device according to claim 6, wherein the connection module may feature means for extending the functionality, especially connection means for a second number pad, additional keys or keypads, for third-party devices or USB connectors.

8. Input device according to claim 6, wherein pressure sensors are assigned to the keys for the purpose of registering the force of key strokes and transferring the information obtained thereby to the readout device, wherein preferably the pressure sensors are assigned to a pressure sensor module which is preferably transparent, located inside the keys, in the representation means, under or above the representation means or between the keys and the representation means, or which, in the case that there is a contact module present, are located on the contact module.

9. Input device according to claim 6, wherein the casing and all components which are inseparably attached to the casing are designed to be cleaning-safe, especially waterproof and dishwasher-proof.

10. Input device according to claim 5, wherein the contact module leaves unoccupied a representation area of the display module, preferably in the area of a number block situated in the area of the keypad, the keys being usable as a calculator and the operations of which are displayed in the aforementioned representation area of the display module, wherein preferably at least the keys of the keypad which implement the calculator possess an independent energy supply.

11. Input device according to claim 4, wherein the key assignment is printed onto the back of the representation means.

12. Input device according claim 4, wherein the single keys are connected to the contact module either along their edges or along their entire surfaces and transparent means of connection are interposed between keys and contact module.

13. Input device according claim 4, wherein a touch screen layer, a knob layer or another control technology is assigned to the representation means, wherein the keys directly or indirectly interact with the respective layer, preferably by means of their edges.

14. Input device according claim 4, wherein either the lid of the casing is at least partially transparent or the contact module Or the respective layer acts as the lid of the casing.

15. Input device according claim 4, with multiple representation means which are assigned to different keypads or different parts of a keypad, wherein preferably multiple representation means are integrated in separate casing modules which can be connected to each other, and said multiple representation means possess keypad modules which can be combined into one keypad, and wherein preferably multiple representation means can be connected to a common readout device for the purpose of data exchange.

16. Input device with multiple representation means and with a transparent keypad situated above a representation means, wherein the keypad consists of a multitude of transparent keys and functions are mapped to the keys of the keypad, the functions being represented by means of symbols which are displayed within an area on the representation means assigned to the respective symbols and situated beneath single keys, and wherein the keypad and the representation means are integrated in a common casing, wherein the representation means is detachably associated to the input device by means of a slot and communicates with the input device in order to determine the functions mapped to the keys, wherein the multiple representation means are assigned to different keypads or different parts of a keypad, and said multiple representation means possess keypad modules which can be combined into one keypad.

17. Input device according to claim 16, wherein the multiple representation means are integrated in separate casing modules which can be connected to each other, and said multiple representation means possess keypad modules which can be combined into one keypad, and wherein preferably multiple representation means can be connected to a common readout device for the purpose of data exchange.

18. Input device with a transparent keypad situated above a representation means, wherein the keypad consists of a multitude of transparent keys and functions are mapped to the keys of the keypad, the functions being represented by means of symbols which are displayed within an area on the representation means assigned to the respective symbols and situated beneath single keys, and wherein the keypad and the representation means are integrated in a common casing, wherein the representation means is detachably associated to the input device by means of a slot and communicates with the input device in order to determine the functions mapped to the keys, wherein the representation means is implemented by a display module which displays symbols underneath the keys representing the functions of the respective keys, and wherein the keypad is placed upon a contact module, wherein the respective keys are attached to the contact module in a detachable or non-detachable manner by means of contact switches realizing a springiness of the keys, and wherein the contact module leaves unoccupied a representation area of the display module, preferably in the area of a number block situated in the area of the keypad, the keys being usable as a calculator and the operations of which are displayed in the aforementioned representation area of the display module.

19. Input device according to claim 18, wherein at least the keys of the keypad, which implement the calculator, possess an independent energy supply.

20. Input device with a transparent keypad situated above a representation means, wherein the keypad consists of a multitude of transparent keys and functions are mapped to the keys of the keypad, the functions being represented by means of symbols which are displayed within an area on the representation means assigned to the respective symbols and situated beneath single keys, and wherein the keypad and the representation means are integrated in a common casing, wherein the representation means is detachably associated to the input device by means of a slot and communicates with the input device in order to determine the functions mapped to the keys, wherein the keypad is placed upon a contact module, wherein the respective keys are attached to the contact module in a detachable or non-detachable manner by means of contact switches realizing a springiness of the keys, and the contact module having a data link to a readout unit, the readout unit being capable of receiving information regarding the activation of keys of the keypad from the contact module and forwarding said information to a system associated with the input device, and wherein pressure sensors are assigned to the keys for the purpose of registering the force of key strokes and transferring, the information obtained thereby to the readout device.

21. Input device according to claim 20, wherein preferably the pressure sensors are assigned to a pressure sensor module which is preferably transparent, located inside the keys, in the representation means, under or above die representation means or between the keys and the representation means, or which, in the case that there is a contact module present, are located on the contact module.

22. Input device according to claim 20, wherein the casing and all components which are inseparably attached to the casing are designed to be cleaning-safe, especially waterproof and dishwasher-proof.

23. Input device with a transparent keypad situated above a representation means, wherein the keypad consists of a multitude of transparent keys and functions are mapped to the keys of the keypad, the functions being, represented by means of symbols which are displayed within an area on the representation means assigned to the respective symbols and situated beneath single keys, and wherein the keypad and the representation means are integrated in a common casing, wherein the representation means is detachably associated to the input device by means of a slot and communicates with the input device in order to determine the functions mapped to the keys, wherein the casing and all components which are inseparably attached to the casing are designed to be cleaning-safe, especially waterproof and dishwasher-proof.

* * * * *